(12) United States Patent
Bronold et al.

(10) Patent No.: US 6,461,488 B1
(45) Date of Patent: Oct. 8, 2002

(54) ELECTROLYSIS APPLIANCE

(75) Inventors: Matthias Bronold, Berlin; Frank Mai, Ressen-Zaue; Henrik Colell; Manfred Becker, both of Berlin, all of (DE)

(73) Assignee: Heliocentris Energiesysteme GmbH, Berlin (DE)

( * ) Notice: Subject to any disclaimer, the term of this patent is extended or adjusted under 35 U.S.C. 154(b) by 48 days.

(21) Appl. No.: 09/617,648

(22) Filed: Jul. 17, 2000

(30) Foreign Application Priority Data

Jul. 15, 1999 (DE) ........................................ 199 34 080
Jul. 15, 1999 (DE) .................................... 299 12 681 U

(51) Int. Cl.[7] .............................................. C25B 9/00
(52) U.S. Cl. ..................................................... 204/266
(58) Field of Search ................................ 204/266, 256, 204/258, 270, 278; 429/12–13

(56) References Cited

U.S. PATENT DOCUMENTS

| | | | | | |
|---|---|---|---|---|---|
| 2,846,384 A | * | 8/1958 | De Nora | ................. | 204/266 X |
| 4,375,400 A | * | 3/1983 | Kircher | ...................... | 204/237 |
| 4,698,144 A | * | 10/1987 | Wainerdi | ..................... | 204/257 |
| 5,064,514 A | * | 11/1991 | Cawlfield et al. | ....... | 206/263 X |
| 5,736,016 A | * | 4/1998 | Allen | ......................... | 204/238 |
| 5,989,407 A | * | 11/1999 | Andrews | .................... | 205/656 |

* cited by examiner

Primary Examiner—Donald R. Valentine
(74) Attorney, Agent, or Firm—Laurence A. Greenberg; Werner H. Stemer; Ralph E. Locher

(57) ABSTRACT

In an electrolysis appliance or a reversible fuel cell which can be operated optionally as a fuel cell or as an electrolysis appliance, a gas reservoir is in the form of a one-piece or two-piece, tubular hollow body. The gas reservoir is open at the top and is split into a reservoir area and an expansion area by a separating plug having an immersion tube which passes through it and points downward. In a region of the reservoir area, the gas reservoirs are each fitted directly to the end plates, or are formed integrally with them. Each of the half-cells are connected to a respective reservoir area and to the electrolyte located in it via channels in the end plate and openings in the respective gas reservoir. The electrolysis appliances or fuel cells which are configured to have an integrated gas reservoir formed in such a way are strong and sturdy, are configured to save space, are easy to handle and can be produced at low cost.

10 Claims, 4 Drawing Sheets

ELECTROLYSIS APPLIANCE

BACKGROUND OF THE INVENTION

Field of the Invention

The invention relates to an electrolysis appliance, in particular for experimental models. The appliance contains at least one electrolysis cell that holds an electrolyte and is split by a membrane into two half-cells. The half-cells form an anode and cathode and are bounded on two opposite outer faces by end plates. The half-cells are each connected to a gas reservoir, which is formed from a storage vessel partially filled with electrolyte and from an expansion vessel with an immersion tube projecting into the storage vessel, for temporary storage and passing on the gases which are produced to a fuel cell. The invention also relates to reversible fuel cells which are connected to a gas reservoir and, by using specific catalysts, can be operated both as an electrolysis appliance (electrolyzer) and, alternatively, as a fuel cell.

Electrolysis appliances are used, for example, for experimental models for demonstration of hydrogen technology in conjunction with a fuel cell and a load supplied with power from it, or for vehicle models and the like driven on the basis of hydrogen technology. The gases produced during the electrolysis process are first of all separated from the electrolyte in a gas separator, and are then passed via pipelines and hoses to a separately disposed gas reservoir.

Published, Non-Prosecuted German Patent Application DE 298 01 668.0 describes an electrolysis appliance having gas separators which are connected to an electrolysis cell and are directly connected to the electrolysis chamber. This forms an integral unit, via a transverse wall which is used as the gas separator base and in each case has first openings to carry away the gases formed. Second openings are also provided for returning the separated electrolyte solution— or alternatively in each case having a joint gas outlet and electrolyte return opening. The gases which leave the gas separator are then, for example, held in a gas reservoir in the form of a pipeline corresponding to Published, Non-Prosecuted German Patent Application DE 298 01 669.9 and are supplied to the fuel cell as required, in order to produce electrical energy.

Another known gas reservoir is intended for use as a container which is-filled with liquid and has an expansion vessel which is open to the environment and out of which a tube projects into the reservoir container. The gas supplied to the reservoir container forces the water into the expansion container in order to equalize the gas volume. Owing to the hydrostatic pressure produced by lifting the column of water, the stored gas can flow to the fuel cell via a gas outlet opening provided in the upper reservoir region.

The known electrolysis appliances, which are used for models and have the corresponding reservoir device, occupy a considerable amount of space, however, and, owing to their complex construction and the necessary pipe connections, are also difficult to handle and, furthermore, can be produced only at high cost.

SUMMARY OF THE INVENTION

It is accordingly an object of the invention to provide an electrolysis appliance, in particular for experimental models that overcomes the above-mentioned disadvantages of the prior art devices of this general type, which saves space, is of simple construction, is easy to handle, and can be produced with little production effort.

With the foregoing and other objects in view there is provided, in accordance with the invention, an electrolysis appliance containing at least one electrolysis cell for holding an electrolyte and having two opposite outer faces. The electrolysis cell further has a membrane splitting the electrolysis cell into two half-cells, one of the two half-cells being an anode and the other of the two half-cells being a cathode. End plates are provided for bounding the two opposite outer faces of the electrolysis cell. Two gas reservoirs for temporary storing and passing on gases produced to a fuel cell are provided. Each of the gas reservoirs is a hollow body and connected to one the two half-cells. The gas reservoirs each have a separator splitting each of the gas reservoirs into a reservoir area holding the electrolyte and an expansion area. Each of the gas reservoirs are fitted directly to a respective one of the end plates in a region of the reservoir area. An immersion tube is held in the separator of each of the gas reservoirs and projects into the reservoir area.

The fundamental idea of the invention is that the reservoir vessel and the expansion vessel are formed from an essentially tubular hollow body, which is split by a separator into a lower reservoir area and an expansion area above it. An immersion tube, which is held in a hole in the separator, projects into the electrolyte in the reservoir area. The reservoir area of the respective gas reservoir for hydrogen or oxygen, respectively, is directly connected to the relevant half-cell (cathode area or anode area) of the electrolysis appliance and to the electrolyte in it, with the hollow body being directly attached to, or integrally formed on, the respective end plate in the region of the reservoir area in the hollow body.

An electrolysis appliance constructed in such a way is distinguished by its integral configuration, to be precise both with respect to the gas reservoir and to its connection to the electrolysis cell, by a compact and robust construction, so that it is disposed in a space-saving manner and is easy to handle. The reservoir area of the gas reservoir at the same time acts as a gas separator. The integral configuration achieved with the features according to the invention is also associated with a considerable reduction in the production costs in comparison with known appliances having gas reservoirs.

The gas reservoir is thus in the form of a single tubular element, which is split into the reservoir area and the expansion area just by introducing an elastic plug with a hole to hold the immersion tube. Alternatively, the gas reservoir can be two-piece hollow body split in a region of the separator. Furthermore, the two-piece hollow body can have a tubular shape.

In the two-piece version of the hollow body, the part which forms the expansion area is fitted detachably to the separator, either by being fitted onto the separator or by being held in a hole in the separator by an integrally formed immersion tube. The part of the hollow body that forms the reservoir area is permanently fitted to the respective end plate, or is integrated in it. The two-piece version of the hollow body, that is to say of the expansion area which can be removed from the reservoir area fitted to the end plate, can be advantageous for packing the electrolysis appliance in an experimental box.

According to a further feature of the invention, the gas reservoir is integrated in the end plate and forms an integral component with it, in order in this way to further simplify assembly of the electrolysis appliance.

The gas can be carried out of the gas reservoir either via a gas outlet opening in the wall of the reservoir area or via a gas outlet tube that passes through the separating plug and the expansion area to the exterior.

The proposed solution can be used not only for an electrolysis appliance, but also for a fuel cell and, in particular, for a reversible fuel cell which, with appropriate polarity reversal, can be operated optionally as a fuel cell or as an electrolyzer.

Other features which are considered as characteristic for the invention are set forth in the appended claims.

Although the invention is illustrated and described herein as embodied in an electrolysis appliance, in particular for experimental models, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
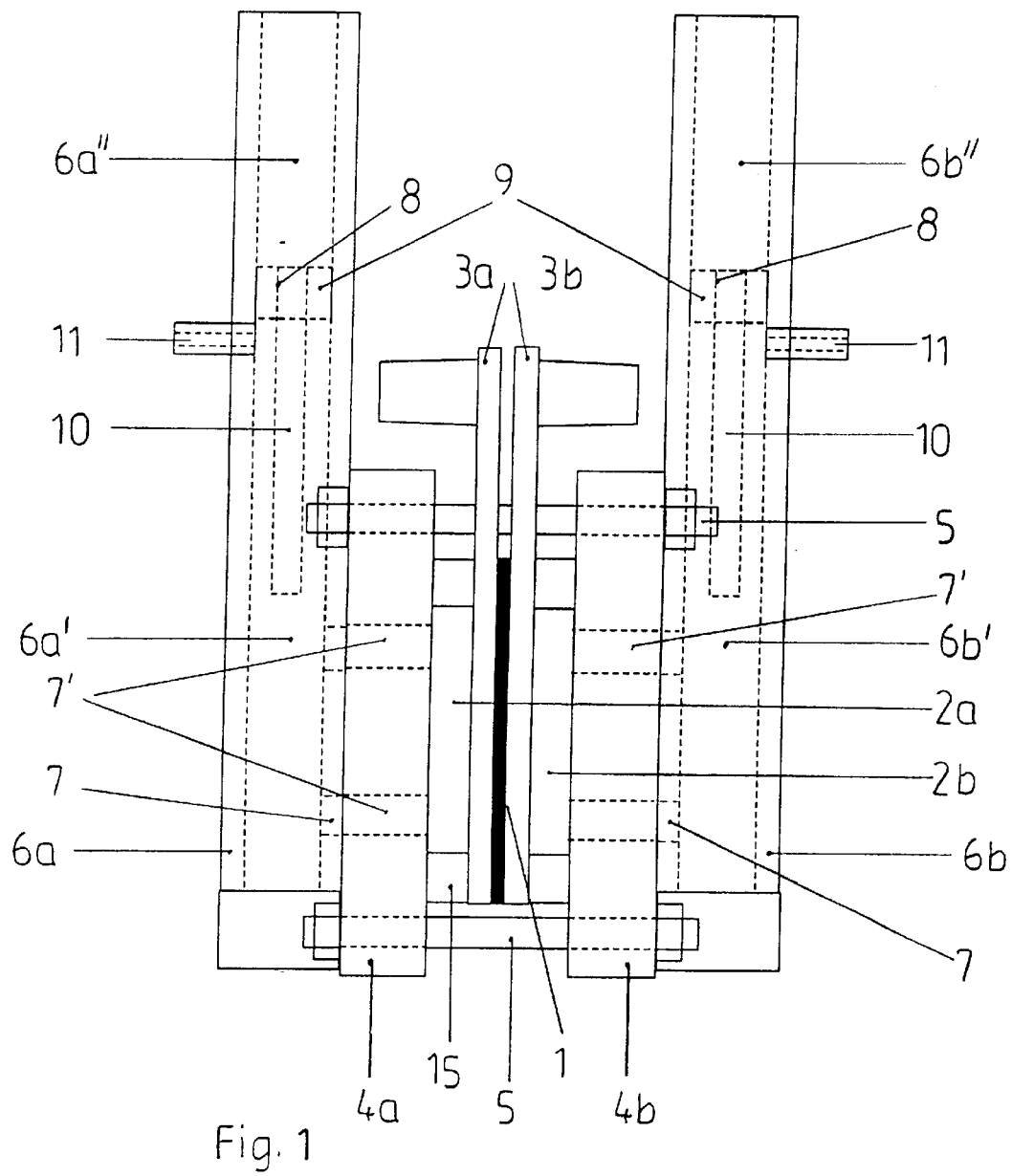
FIG. 1 is a diagrammatic, front-elevational view of an electrolysis appliance having gas reservoirs fitted to its end plates according to the invention.

In all the figures of the drawing, sub-features and integral parts that correspond to one another bear the same reference symbol in each case. Referring now to the figures of the drawing in detail and first, particularly, to FIGS. 1 and 2 thereof, there is shown an electrolysis appliance formed of a water-filled electrolysis cell, which is split by a membrane-electrode unit 1 into two half-cells, namely an anode area 2a and a cathode area 2b. The anode and the cathode of the membrane-electrode unit 1 are connected via electrical conductors 3a, 3b to a power source, for example a non-illustrated solar module. The electrolysis cell is covered by end plates 4a, 4b on two opposite outer faces, and the end plates 4a, 4b are held together by threaded bolts 5, with the half-cells being formed between them and the membrane-electrode unit 1 as well as a frame 15. The two end plates 4a, 4b are respectively connected to a tubular gas reservoir 6a, 6b for oxygen and hydrogen, respectively. The two partially water-filled gas reservoirs 6a, 6b are connected directly, that is to say without the interposition of pipelines or hoses, to a respective half-cell 2a, 2b via openings 7 in the gas reservoir 6a, 6b and channels 7' in the end plates 4a, 4b. A separating plug 9 provided with a hole 8 is incorporated in each of the gas reservoirs 6a, 6b, which are open at the top. An immersion tube 10, which projects into the water in she gas reservoir 6a, 6b, is disposed in the respective hole 8.

The hydrogen and oxygen gases produced in the half-cells 2a, 2b when a voltage is applied to the electrical conductors 3a, 3b pass via the openings 7, 7' into a reservoir area 6a', 6b'. As the volume of gas above the liquid level increases, the water in the reservoir area 6a', 6b' is forced via the immersion tube 10 into an expansion area 6a", 6b" above the separating plug 9. A gas outlet opening 11 provided underneath the separating plug 9 in the respective reservoir area 6a', 6b remains closed during the storage process. When the gas outlet opening 11 is opened, the stored gas is forced out of the gas reservoir 6a, 6b by the hydrostatic pressure produced by the column of water, while the liquid level in the expansion area 6a", 6b– falls once again.

Figure 2:
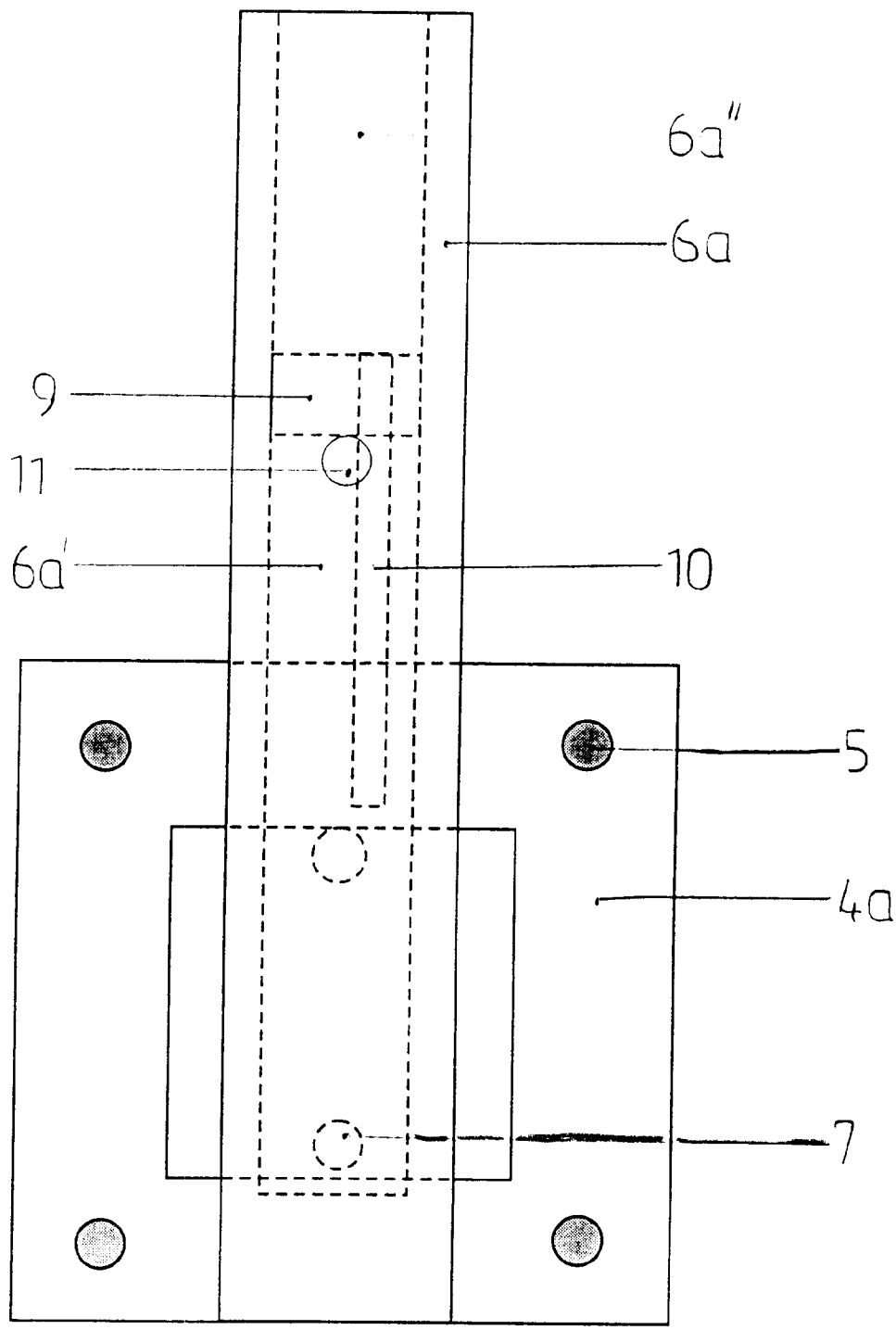
FIG. 2 is a side-elevational view corresponding to FIG. 1.
Figure 3:
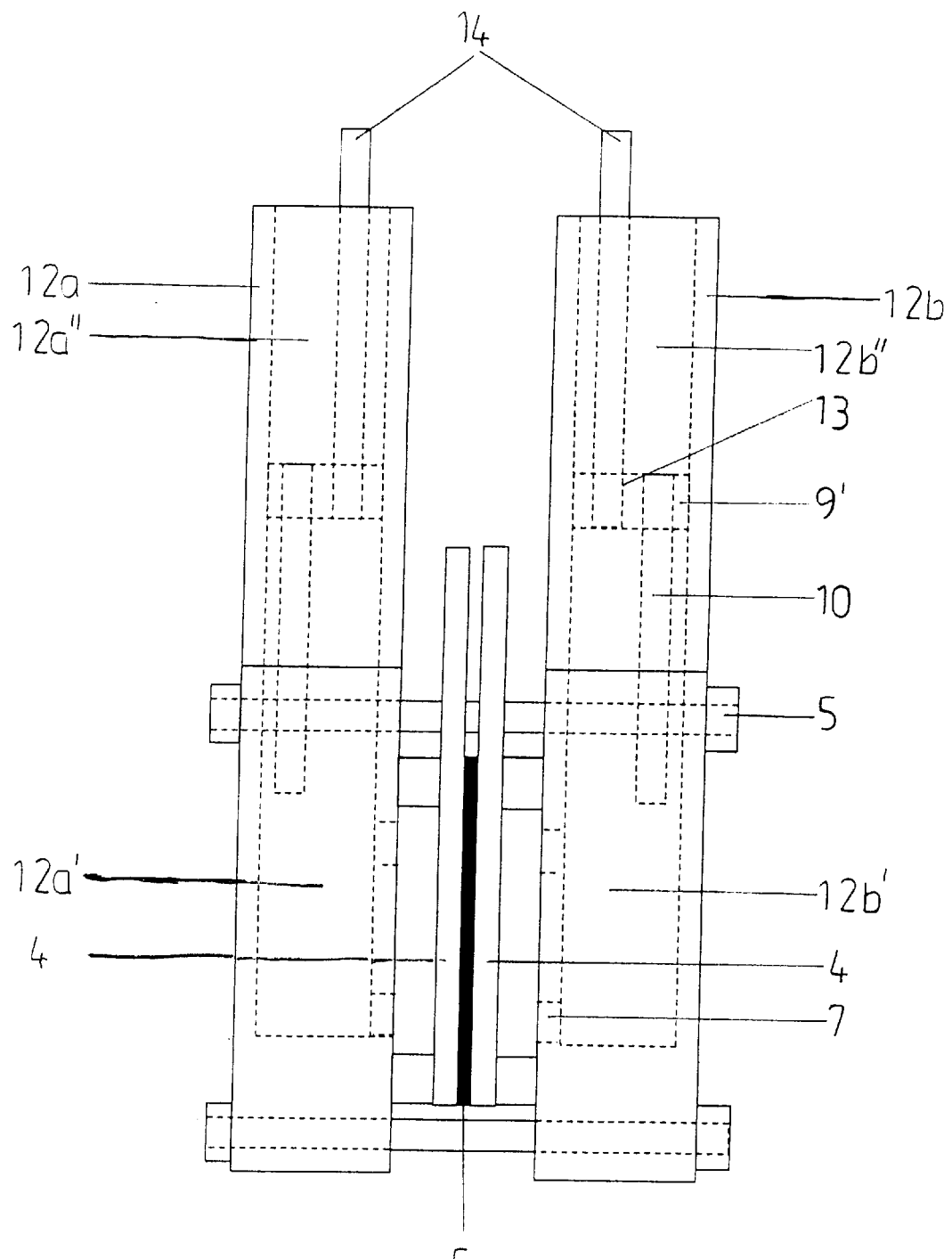
FIG. 3 is a front-elevational view of another embodiment variant of the electrolysis appliance shown in FIG. 1.
Figure 4:
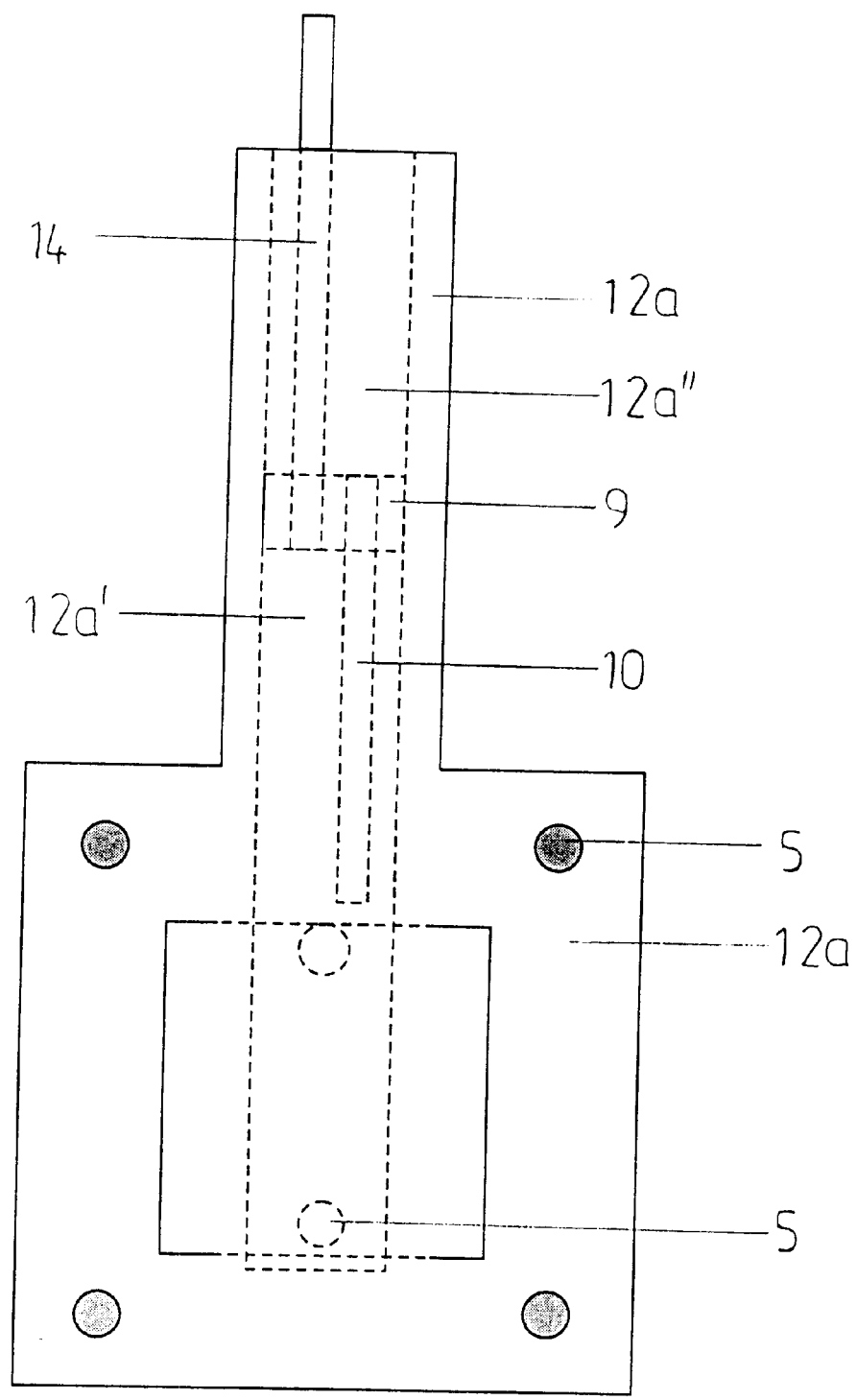
FIG. 4 is a side-elevational view corresponding to FIG. 3.

In the embodiment variant according to FIGS. 3 and 4, in which identical components are identified by the same reference symbols as in FIGS. 1 and 2, the gas reservoirs are integrated in the end plates. That is to say a gas reservoir and an end plate in each case form an integrally produced, common component 12a, 12b. In consequence, the production costs are further reduced, and the electrolysis appliance, overall, is even more compact than in the embodiment shown in FIGS. 1 and 2. A further difference is that the gas emerges from a reservoir area 12a', 12b' via a gas outlet tube 14 which is disposed in another hole 13 in a separating plug 9' and passes upward through an expansion area 12a", 12b".

We claim:

1. An electrolysis appliance, comprising:

at least one electrolysis cell for holding an electrolyte and having two opposite outer faces, said electrolysis cell further having a membrane splitting said electrolysis cell into two half-cells, one of said two half-cells being an anode and another of said two half-cells being a cathode;

end plates bounding said two opposite outer faces of said electrolysis cell;

two gas reservoirs for temporary storing and passing on gases produced to a fuel cell, each of said gas reservoirs being a hollow body and connected to said two half-cells, said gas reservoirs each having a separator splitting each of said gas reservoirs into a reservoir area for holding the electrolyte and an expansion area, each of said gas reservoirs fitted directly to a respective one of said end plates in a region of said reservoir area; and an immersion tube held in said separator of each of said gas reservoirs and projecting into said reservoir area.

2. The electrolysis appliance according to claim 1, wherein said hollow body is a two-piece hollow body split in a region of said separator.

3. The electrolysis appliance according to claim 2, wherein said expansion area is one piece of said two-piece hollow body and is fitted to said separator.

4. The electrolysis appliance according to claim 2, wherein said expansion area and said immersion tube are formed as an integral unit and said expansion area is held in said separator by said immersion tube integrally formed in said expansion area.

5. The electrolysis appliance according to claim 2, wherein said two-piece hollow body has a tubular shape.

6. The electrolysis appliance according to claim 5, wherein said separator for splitting each of said gas reservoirs is an elastic separating plug.

7. The electrolysis appliance according to claim 6, including a gas outlet having an opening formed therein disposed in said reservoir area underneath said elastic separating plug to form an outlet from said reservoir area.

8. The electrolysis appliance according to claim 6, wherein said elastic separating plug has a hole formed therein, and including a gas outlet tube held in said hole in said separating plug and passing upward through said expansion area for forming a gas outlet from said reservoir area.

9. The electrolysis appliance according to claim 1, wherein each of said gas reservoirs and a respective one of said end plates are formed as an integral component resulting in a first integral component and a second integral component, and including threaded bolts for bracing said first integral component to said second integral component disposed opposite to said first integral component.

10. The electrolysis appliance according to claim 1, including electrical conductors connected to said electrolysis cell.

* * * * *